US010122207B2

United States Patent
Kha et al.

(10) Patent No.: US 10,122,207 B2
(45) Date of Patent: Nov. 6, 2018

(54) AUTOMATIC TRANSFER SWITCH CIRCUITS AND CONTROL METHODS

(71) Applicant: Astec International Limited, Kowloon (HK)

(72) Inventors: Kim Ly Kha, Tai Po (HK); Lei Shi, Kowloon (HK)

(73) Assignee: Astec International Limited, Kwun Tong, Kowloon (HK)

( * ) Notice: Subject to any disclaimer, the term of this patent is extended or adjusted under 35 U.S.C. 154(b) by 179 days.

(21) Appl. No.: 15/251,095

(22) Filed: Aug. 30, 2016

(65) Prior Publication Data

US 2018/0062426 A1 Mar. 1, 2018

(51) Int. Cl.
*H02J 7/00* (2006.01)
*H02J 9/06* (2006.01)

(52) U.S. Cl.
CPC .................. *H02J 9/061* (2013.01)

(58) Field of Classification Search
CPC ...................................... H02J 9/061
See application file for complete search history.

(56) References Cited

U.S. PATENT DOCUMENTS

| 4,405,867 | A | * | 9/1983 | Moakler | H02J 9/06 307/64 |
| 6,137,706 | A | * | 10/2000 | Nesbitt | H02J 3/00 363/142 |
| 2013/0106190 | A1 | * | 5/2013 | Lin | H02J 9/061 307/64 |
| 2017/0373527 | A1 | * | 12/2017 | Thurk | H02J 9/06 |
| 2018/0034314 | A1 | * | 2/2018 | Tomassi | H02J 9/061 |

* cited by examiner

*Primary Examiner* — Jared Fureman
*Assistant Examiner* — Duc M Pham
(74) *Attorney, Agent, or Firm* — Harness, Dickey & Pierce, P.L.C.

(57) ABSTRACT

According to some aspects of the present disclosure, automatic transfer switch circuits and control methods are disclosed. Example automatic transfer switch circuits include a first voltage input having a line terminal and a neutral terminal, a second voltage input having a line terminal and a neutral terminal, a voltage output having a line output terminal and a neutral output terminal, a first relay coupled to the line terminal of the first voltage input and the line terminal of the second voltage input, a second relay coupled to the neutral terminal of the first voltage input and the neutral terminal of the second voltage input, a third relay coupled between the line output terminal and at least one of the first relay and second relay, a fourth relay coupled between the neutral output terminal and at least one of the first relay and the second relay, and a controller.

19 Claims, 4 Drawing Sheets

AUTOMATIC TRANSFER SWITCH CIRCUITS AND CONTROL METHODS

FIELD

The present disclosure relates to automatic transfer switch circuits and control methods.

BACKGROUND

This section provides background information related to the present disclosure which is not necessarily prior art.

Many electronic equipment and/or systems (e.g., power supplies) use multiple power sources to increase the reliability of the power supplied to a load of electronic equipment and/or systems. Automatic transfer switch circuits are commonly used to alternate between two different power sources by switching from a primary power source to a secondary backup power source when the primary power source fails, is unable to provide sufficient power, voltage, etc. Accordingly, the automatic transfer switch circuit assists in maintaining a supply of power to an electronic system in the event of a failure of one of a primary power source.

SUMMARY

This section provides a general summary of the disclosure, and is not a comprehensive disclosure of its full scope or all of its features.

According to one aspect of the present disclosure, an automatic transfer switch circuit includes a first voltage input having a line terminal and a neutral terminal and a second voltage input having a line terminal and a neutral terminal. The circuit also includes a voltage output having a line output terminal and a neutral output terminal, a first relay coupled to the line terminal of the first voltage input and the line terminal of the second voltage input, a second relay coupled to the neutral terminal of the first voltage input and the neutral terminal of the second voltage input, a third relay coupled between the line output terminal and at least one of the first relay and second relay, a fourth relay coupled between the neutral output terminal and at least one of the first relay and the second relay, and a controller coupled to the relays to control a state of each of the relays.

According to another aspect of the present disclosure, an automatic transfer switch circuit includes a first voltage input having a line terminal and a neutral terminal and a second voltage input having a line terminal and a neutral terminal. The circuit also includes a voltage output having a line output terminal and a neutral output terminal and exactly four relays coupled between the terminals of the first voltage input, the terminals of the second voltage input, and the terminals of the voltage output. The circuit further includes a controller coupled to the four relays to control a state of each of the four relays.

According to yet another aspect of the present disclosure, a method of operating an automatic transfer switch circuit is disclosed. The circuit includes a first voltage input having a line terminal and a neutral terminal, a second voltage input having a line terminal and a neutral terminal, a voltage output having a line output terminal and a neutral output terminal, a first relay coupled to the line terminals of the first voltage input and the second voltage input, a second relay coupled to the neutral terminals of the first voltage input and the second voltage input, a third relay coupled between the line output terminal and at least one of the first relay and second relay, a fourth relay coupled between the neutral output terminal and at least one of the first relay and the second relay. The method includes placing the first relay in a first state to couple the line terminal of the first voltage input to a first output terminal of the first relay, and placing the first relay in a second state to couple the line terminal of the second voltage input to a second output terminal of the first relay.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
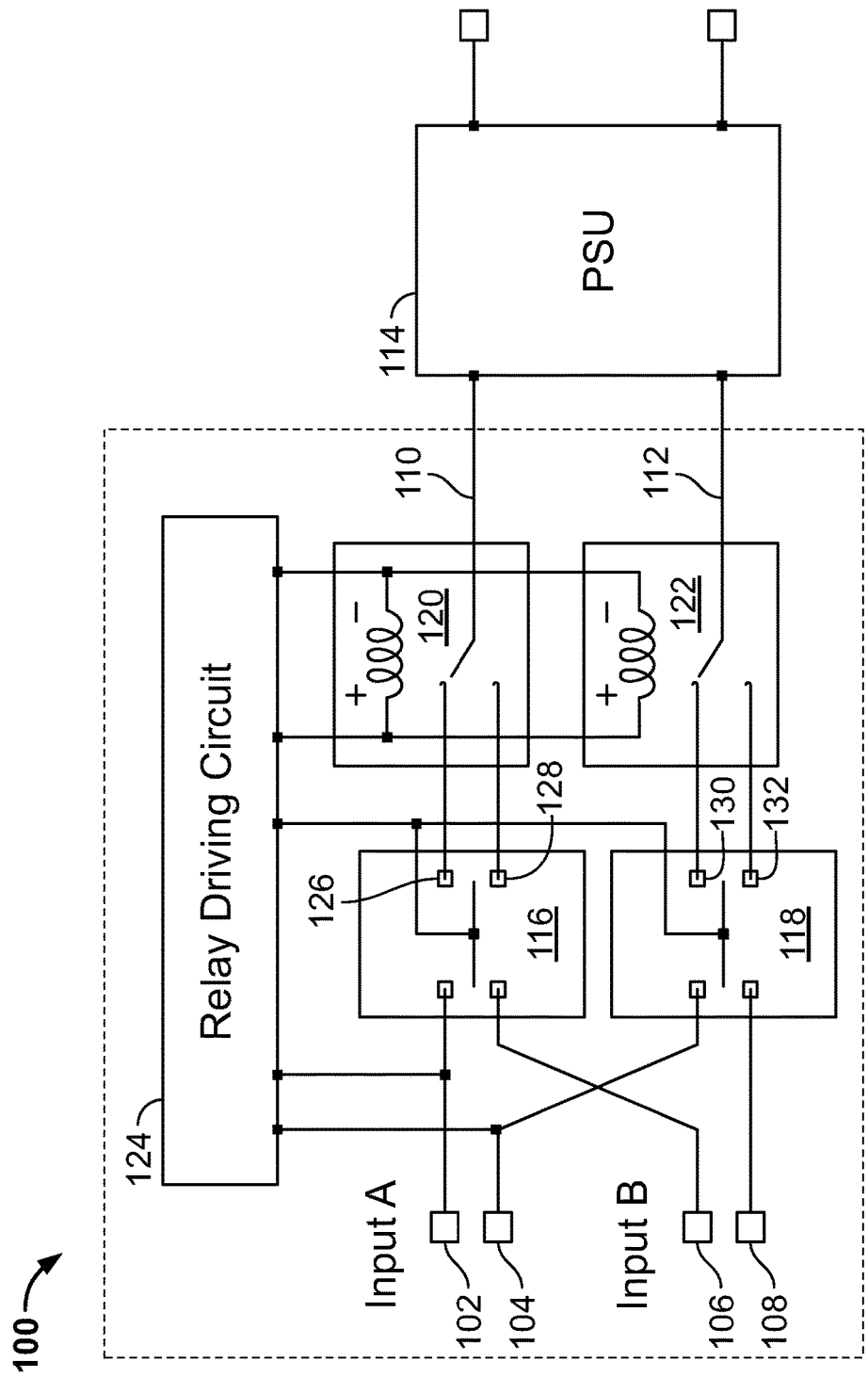
FIG. 1 is a block diagram of an example automatic transfer switch circuit according to one embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An automatic transfer switch circuit according to one example embodiment of the present disclosure is illustrated in FIG. 1 and indicated generally by reference number 100. As shown in FIG. 1, the automatic transfer switch circuit 100 includes a voltage input A having a line terminal 102 and a neutral terminal 104, and a voltage input B having a line terminal 106 and a neutral terminal 108. The circuit 100 also includes a voltage output having line output terminal 110 and a neutral output terminal 112.

The automatic transfer switch circuit 100 may transfer between coupling voltage input A to the voltage output terminals 110, 112 and coupling voltage input B to the voltage output terminals 110, 112. In some embodiments the voltage input A is coupled to a primary power source and the voltage input B is coupled to a secondary backup power source. Accordingly, the automatic transfer switch circuit 100 can provide power from the primary power source (coupled to voltage input A) to the voltage output terminals 110, 112 while the primary power source is operating normally and providing sufficient power, and then transfer to the secondary backup power source (coupled to voltage input B) when the primary power source loses power, drops below a sufficient voltage, etc., so that the secondary power source provides power to voltage output terminals 110, 112. When the primary power source returns to normal operation (e.g., provides sufficient power, voltage, etc.), the automatic transfer switch circuit 100 can switch back to the primary power source coupled to input terminals 102, 104 of voltage input A.

Four relays are coupled between the voltage input A, the voltage input B, and the voltage output terminals 110, 112. Specifically, relay 116 is coupled to the line terminal 102 of voltage input A and the line terminal 106 of input B. Relay 118 is coupled to the coupled to the neutral input 104 of voltage input A and the neutral terminal 108 of voltage input B. Accordingly, relay 116 receives the line input voltages from both voltage input A and voltage input B, and relay 118 receives the neutral input voltages from both voltage input A and voltage input B.

Each relay 116 and 118 includes two relay input terminals, such that the respective line (or neutral) inputs from voltage input A and voltage input B connected to a different one of the two relay input terminals of the relay. This allows the line (or neutral) inputs to be alternated by the respective relay between voltage input A and voltage input B.

Each relay 116 and 118 also includes two relay output terminals. Relay 116 includes relay output terminal 126 and relay output terminal 128. Relay 118 includes relay output terminal 130 and relay output terminal 132.

Each relay is adapted to alternately couple a voltage input at one of the two relay input terminals to the respective relay output terminal. Specifically, relay 116 couples the line terminal 102 of voltage input A to the relay output terminal 126 in a first relay state, and couples the line terminal 106 of voltage input B to the relay output terminal 128 in a second state. Similarly, relay 118 couples the neutral terminal 104 of voltage input A to the relay output terminal 130 in a first relay state, and couples the neutral terminal 108 of voltage input B to the relay output terminal 132 in a second state.

Accordingly, relay 116 separately couples the line terminal of either voltage input A or voltage input B to the respective one of the relay output terminals of relay 116. This allows relay 116 to maintain isolation between the line terminals of voltage input A and voltage input B to maintain safety and inhibit damage to devices, voltage sources, etc. by reducing the possibility of the line terminals 102, 106 connecting to one another.

Similarly, relay 118 separately couples the neutral terminal of either voltage input A or voltage input B to the respective one of the relay output terminals of relay 118. This allows relay 118 to maintain isolation between the neutral terminals of voltage input A and voltage input B to maintain safety and inhibit damage to devices, voltage sources, etc. by reducing the possibility of the neutral terminals 104, 108 connecting to one another.

Relay 120 is coupled between relay 116 and the output line terminal 110. Relay 120 includes two relay input terminals and one relay output terminal. One of the relay input terminals of relay 120 is coupled to the relay output terminal 126 of relay 116 so that the relay 120 is coupled to line terminal 102 of voltage input A when the relay 116 is in the first state. The other relay input terminal of relay 120 is coupled to the relay output terminal 128 of relay 116 so that relay 120 is coupled to line terminal 106 of voltage input B when relay 116 is in a second state.

Accordingly, relay 120 is only coupled to the respective line terminal of one of voltage input A and voltage input B at one time. This maintains isolation between the line terminals of voltage input A and voltage input B because relay 116 can only connect one of the line terminals 102, 106 through relay 116 at a time, depending on the state of relay 116.

Relay 120 is operable to alternately couple the relay output terminal 126 of relay 116 to the output line terminal 110 in a first state and to couple the relay output terminal 128 of relay 116 to the output line terminal 110 in a second state. Accordingly, relay 120 can alternate between providing power to output line terminal 110 from either voltage input A or voltage input B.

Similarly, relay 122 is coupled between relay 118 and the output neutral terminal 112. Relay 122 includes two relay input terminals and one relay output terminal. One of the relay input terminals of relay 122 is coupled to the relay output terminal 130 of relay 118 so that the relay 122 is coupled to neutral terminal 104 of voltage input A when the relay 118 is in the first state. The other relay input terminal of relay 122 is coupled to the relay output terminal 132 of relay 118 so that the relay 122 is coupled to neutral terminal 108 of voltage input B when the relay 118 is in a second state.

Accordingly, relay 122 is only coupled to the respective neutral terminal of one of voltage input A and voltage input B at one time. This maintains isolation between the neutral terminals of voltage input A and voltage input B because relay 118 can only connect one of the neutral terminals 104, 108 through relay 118 at a time, depending on the state of relay 118.

Relay 122 is operable to alternately couple the relay output terminal 130 of relay 118 to the output neutral terminal 112 in a first state and to couple the relay output terminal 132 of relay 118 to the output neutral terminal 112 in a second state. Accordingly, relay 122 can alternate between providing power to output neutral terminal 112 from either voltage input A or voltage input B.

The four relays 116, 118, 120 and 122 are coupled together in an arrangement that allows for automatic transfer between providing either one of voltage input A and voltage input B to the output terminals 110, 112. Because relay 116 is coupled to the line terminals of voltage inputs A and B, and relay 118 is coupled to the neutral terminals of voltage inputs A and B, relays 116 and 118 can alternately couple one of voltage input A and voltage input B to the relay output terminals of relays 116 and 118. This provides a level of isolation protection because relays 116 and 118 should inhibit voltage input A and voltage input B from ever both being coupled to an output terminal of the relays 116 and 118.

Further, relays 120 and 122 are coupled to the output terminals of relays 116 and 118, respectively, to alternately couple the received input voltage A or B to the output terminals 110, 112 of the automatic transfer circuit 100. Relays 120 and 122 provide another level of isolation protection to inhibit received voltage inputs A and B from being connected together. Accordingly, the relay arrangement in circuit 100 may provide inherent and automatic switchover protection to inhibit the voltage inputs A and B from being coupled together, regardless of control sequence of the relays, control failure, glitches, etc.

The relays 116, 118, 120 and 122 can be any suitable relays including mechanical relays, solid state relays, etc. As illustrated in FIG. 1, relays 116 and 118 are 1A+1B relays, while relays 120 and 122 are single-pole double-throw (SPDT) relays. As should be apparent, other embodiments may include any suitable combination of relays types in the automatic transfer switch circuit 100.

Figure 2B:
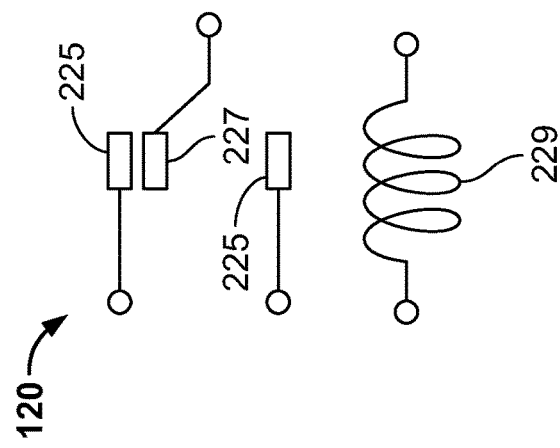
FIG. 2B is a block diagram of another example relay of the automatic transfer switch circuit of FIG. 1.
Figure 2A:
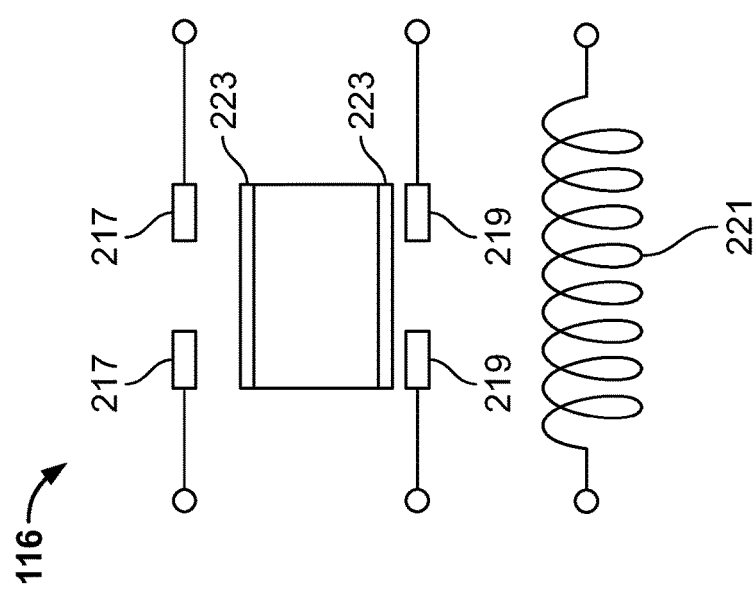
FIG. 2A is a block diagram of one example relay of the automatic transfer switch circuit of FIG. 1.

FIG. 2A illustrates an example block diagram of relay 116. As illustrated in FIG. 2A, the relay 116 is a 1A+1B relay, having one normally open (NO) contact 217 and one normally closed (NC) contact 219. A coil 221 drives a moving contact 223 moves between the normally open contact 217 and the normally closed contact 219 based on a voltage, current, etc. signal applied to the coil 221. When the coil 221 drives the moving contact 223 to the normally closed contact 219, the normally closed contact 219 is closed while the normally open contact 217 is opened. When the coil 221 drives the moving contact 223 to the normally open contact 217, the normally open contact 217 is closed while the normally closed contact 219 is opened.

The relay 116 may be a latch type relay, such that when the driving signal to the coil 221 is removed, the moving contact 223 will keep its state until a reverse driving signal is applied to the coil 221. As should be apparent, the relay 116 may include other suitable topologies in other embodiments.

FIG. 2B illustrates an example block diagram of relay 120. As illustrated in FIG. 2B, the relay 120 is a single-pole, double-throw (SPDT) relay having two contacts 225 and a moving contact 227. The coil 229 drives the moving contact 227 between the contacts 225 based on a driving signal applied to the coil 229. As should be apparent, the relay 120 may include other suitable topologies in other embodiments.

Controller 124 (e.g., a relay driving circuit) is coupled to relays 116, 118, 120 and 122 and configured to control states of the relays to provide automatic transfer switching between voltage input A and voltage input B.

The controller 124 may place each of the relays in a first state to couple voltage input A to the output terminals 110, 112. For example, the controller 124 may place relay 116 in a first state such that line terminal 102 is coupled to the relay output terminal 126 of relay 116, and place relay 120 in a first state such that the relay output terminal 126 of relay 116 is coupled to the output line terminal 110, thereby coupling the line terminal 102 of voltage input A to the output line terminal 110.

Similarly, the controller 124 may place relay 118 in a first state such that neutral terminal 104 is coupled to the relay output terminal 130 of relay 118, and place relay 122 in a first state such that the relay output terminal 130 of relay 118 is coupled to the output neutral terminal 112, thereby coupling the neutral terminal 104 of voltage input A to the output neutral terminal 112.

In order to transfer to the voltage input B, the controller 124 may place relay 116 in a second state such that line terminal 106 is coupled to the relay output terminal 128 of relay 116, and place relay 120 in a second state such that the relay output terminal 128 of relay 116 is coupled to the output line terminal 110, thereby coupling the line terminal 106 of voltage input B to the output line terminal 110.

The controller 124 may also place relay 122 in a second state such that neutral terminal 108 is coupled to the relay output terminal 132 of relay 118, and place relay 122 in a second state such that the relay output terminal 132 of relay 118 is coupled to the output neutral terminal 112, thereby coupling the neutral terminal 108 of voltage input B to the output neutral terminal 112.

The controller 124 may be configured using any suitable hardware and/or software configurations. For example, the controller 124 may include any suitable processor(s), memory, computer-executable instructions stored in memory, logic circuitry, etc. to perform methods described herein.

The voltage inputs A and B can be coupled to any suitable power sources. For example, voltage input A and/or voltage input B can be coupled to an alternating current (AC) power sources. A line terminal of the AC power source can be coupled to line terminal 102 of voltage input A and a neutral terminal of the AC power source can be coupled to the neutral terminal 104 of voltage input A. Voltage input B could similarly be coupled to line and neutral terminals of an AC power source.

Voltage input A and/or voltage input B could be coupled to direct current (DC) power sources. For example, a positive terminal of a DC power source can be coupled to line terminal 102 of voltage input A and a negative terminal of the DC power source can be coupled to the neutral terminal 104 of voltage input A. Voltage input B could similarly be coupled to line and neutral terminals of a DC power source.

In some embodiments, voltage input A may be coupled to a primary power source (e.g., a utility power grid, etc.) and voltage input B may be coupled to a secondary backup power source (e.g., a backup generator, a batter, etc.). The automatic transfer circuit 100 may be used in a circuit arrangement where input redundancy is required.

As shown in FIG. 1, the automatic transfer switch circuit 100 is an independent unit having output terminals 110, 112 coupled to a power supply unit 114. In other embodiments, the automatic transfer switch circuit 100 may be integrated in the power supply unit 114. In some embodiments, the output terminals 110, 112 may be coupled to any suitable load(s) that can be switched between multiple input power sources. For example, the circuit 100 may be used in a dual input power supply unit application where isolation between the dual inputs is required.

As used herein, a terminal can be any suitable connection for transmitting voltage, current, power, etc. For example, a terminal could include an electrical connector, a wire, a printed circuit, etc.

Figure 3:
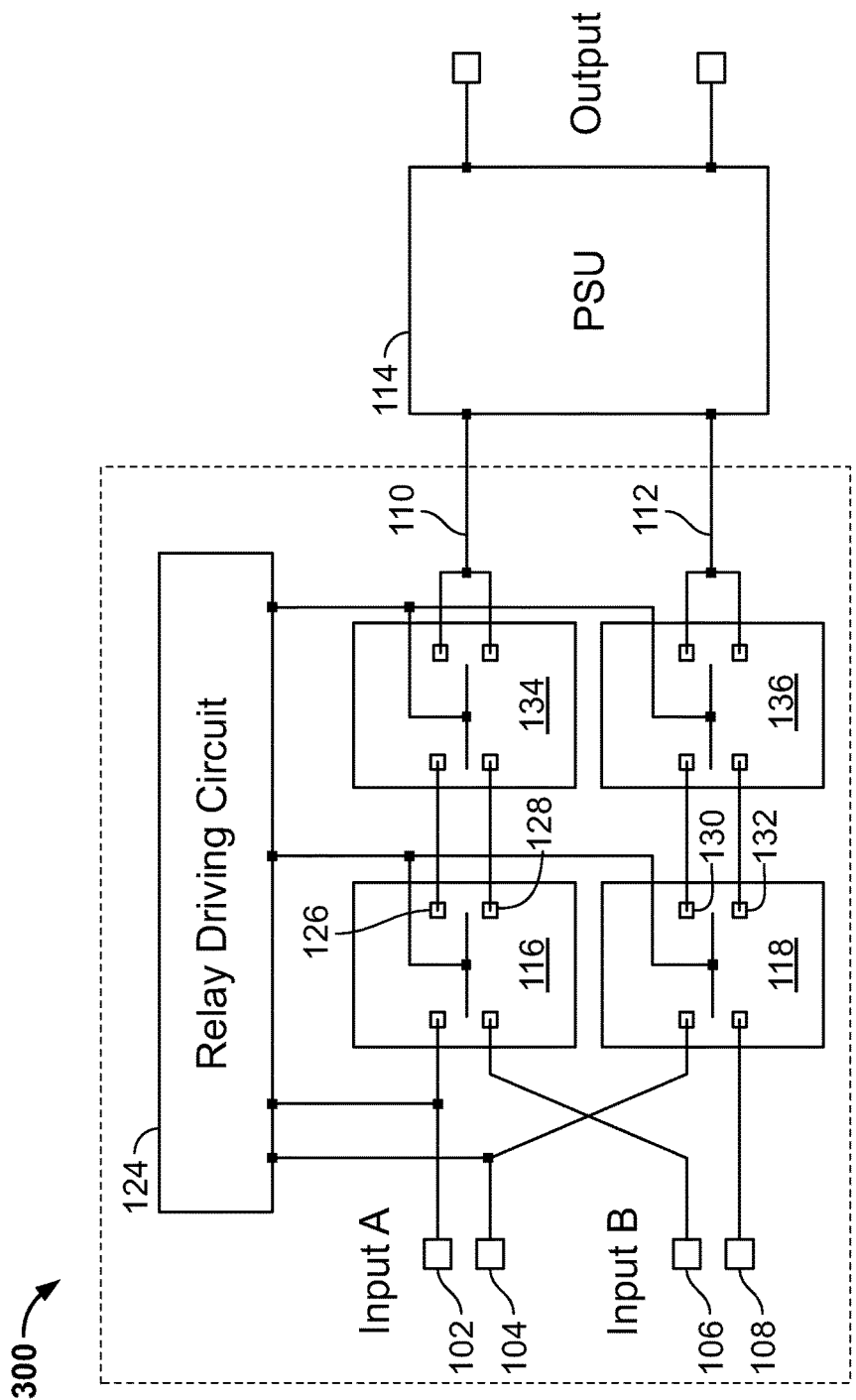
FIG. 3 is a block diagram of another example automatic transfer switch circuit including identical relays, according to another embodiment of the present disclosure.

FIG. 3 illustrates a circuit diagram of an automatic transfer switch circuit 300 according to another example embodiment of the present disclosure. The automatic transfer switch circuit 300 is similar to the automatic transfer switch circuit 100 of FIG. 1, but includes identical relays.

As shown in FIG. 3, relays 116, 118, 134 and 136 are identical (e.g., have an identical structure, etc.). Relays 116, 118, 134 and 136 each have two relay input terminals and two relay output terminals.

The two output relay terminals of relay 134 are coupled together and connected to output line terminal 110. Accordingly, relay 134 of circuit 300 provides a similar function to the relay 120 of circuit 100 in FIG. 1, by alternately coupling one of the relay output terminal 126 of relay 116 and the relay output terminal 128 of relay 116 to the output line terminal 110. This allows relay 134 to separately couple either line terminal 102 of voltage input A or line terminal 106 of voltage input B to the output line terminal 110, depending on the state of relay 134.

Similarly, the two output relay terminals of relay 136 are coupled together and connected to output neutral terminal 112. Accordingly, relay 136 of circuit 300 provides a similar function to the relay 122 of circuit 100 in FIG. 1, by alternately coupling one of the relay output terminal 130 of relay 118 and the relay output terminal 132 of relay 118 to the output neutral terminal 112. This allows relay 136 to separately couple either neutral terminal 104 of voltage input A or neutral terminal 108 of voltage input B to the output neutral terminal 112, depending on the state of relay 136.

Accordingly, automatic transfer switch circuit 300 may be operated similarly to circuit 100 of FIG. 1, to provide one of either voltage input A or voltage input B to the output terminals 110, 112.

Figure 4:
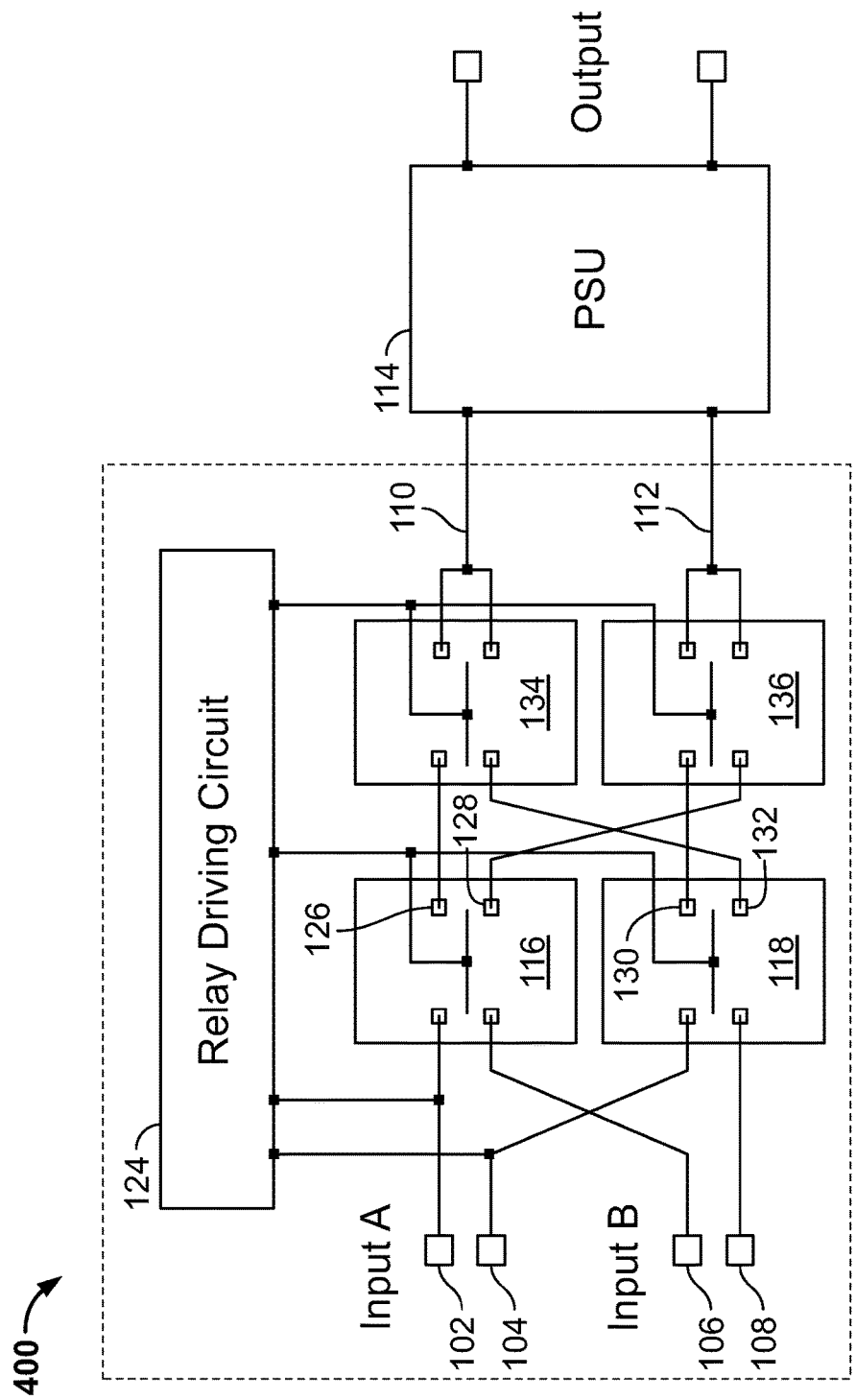
FIG. 4 is a block diagram of another example automatic transfer switch circuit which is similar to the circuit of FIG. 3, but includes different wiring connections between the relays.

FIG. 4 illustrates a circuit diagram of an automatic transfer switch circuit 400 according to another example embodiment of the present disclosure. The automatic transfer switch circuit 400 is similar to the automatic transfer switch circuit 300 of FIG. 3, but includes different wiring connections between the relays.

As shown in FIG. 4, the output terminal 128 of relay 116 is coupled to an input terminal of relay 136. The output terminal 132 of relay 118 is coupled to an input terminal of relay 134. This wiring connection pattern may reduce safety issues if the state of the relays are not known when the automatic transfer switch circuit 400 first receives power, thereby reducing the likelihood of coupling different input voltage sources.

The two output relay terminals of relay 134 are coupled together and connected to output line terminal 110. Accordingly, relay 134 of circuit 400 can alternately couple one of the relay output terminal 126 of relay 116 and the relay output terminal 132 of relay 118 to the output line terminal 110. This allows relay 134 to separately couple either line terminal 102 of voltage input A or neutral terminal 108 of voltage input B to the output line terminal 110, depending on the state of relay 134.

Similarly, the two output relay terminals of relay 136 are coupled together and connected to output neutral terminal 112. Accordingly, relay 136 of circuit 300 can alternately couple one of the relay output terminal 130 of relay 118 and the relay output terminal 128 of relay 116 to the output neutral terminal 112. This allows relay 136 to separately couple either neutral terminal 104 of voltage input A or line terminal 106 of voltage input B to the output neutral terminal 112, depending on the state of relay 136.

Accordingly, automatic transfer switch circuit 400 may be operated similarly to circuit 300 of FIG. 3, to provide one of either voltage input A or voltage input B to the output terminals 110, 112.

In some embodiments exactly four relays may be coupled between voltage input A, voltage input B and the output terminals 110, 112, as shown in FIGS. 1, 3 and 4, such that no additional relays are included in the circuits 100, 300, 400.

In another embodiment, a method of operating an automatic transfer switch circuit is disclosed. The circuit includes a first voltage input having a line terminal and a neutral terminal, a second voltage input having a line terminal and a neutral terminal, a voltage output having a line output terminal and a neutral output terminal, a first relay coupled to the line terminals of the first voltage input and the second voltage input, a second relay coupled to the neutral terminals of the first voltage input and the second voltage input, a third relay coupled between the line output terminal and at least one of the first relay and second relay, a fourth relay coupled between the neutral output terminal and at least one of the first relay and the second relay. The example method includes placing the first relay in a first state to couple the line terminal of the first voltage input to a first output terminal of the first relay, and placing the first relay in a second state to couple the line terminal of the second voltage input to a second output terminal of the first relay.

The method may also include placing the second relay in a first state to couple the neutral terminal of the first voltage input to a first output terminal of the second relay, and placing the second relay in a second state couple the line terminal of the second voltage input to a second output terminal of the first relay.

The third relay can be placed in a first state to couple the first output terminal of the first relay to the line output terminal of the voltage output, and placed in a second state to couple the second output terminal of the first relay to the line output terminal of the voltage output. In some embodiments, the third relay may couple the second output terminal of the second relay to the line output terminal of the voltage output in the second state.

The fourth relay can be placed in a first state to couple the first output terminal of the second relay to the neutral output terminal of the voltage output, and placed in a second state to couple the second output terminal of the second relay to the neutral output terminal of the voltage output. In some embodiments, the fourth relay may couple the second output terminal of the first relay to the neutral output terminal of the voltage output in the second state.

Any of the example embodiments and aspects disclosed herein may be used in any suitable combination with any other example embodiments and aspects disclosed herein without departing from the scope of the present disclosure. For example, automatic transfer switch circuits described herein may implement other control methods, the control methods described herein may be implemented in other automatic transfer switch circuits, etc. without departing from the scope of the present disclosure.

Example embodiments and aspects of the present disclosure may provide any of the following advantages: reduced number of relays in the automatic transfer switch circuit, reduced space occupied by relays in the automatic transfer switch circuit, inherent and automatic switchover protection regardless of relay control sequence and/or control failure, glitch, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An automatic transfer switch circuit comprising:
 a first voltage input having a line terminal and a neutral terminal;
 a second voltage input having a line terminal and a neutral terminal;
 a voltage output having a line output terminal and a neutral output terminal;
 a first relay coupled to the line terminal of the first voltage input and the line terminal of the second voltage input;
 a second relay coupled to the neutral terminal of the first voltage input and the neutral terminal of the second voltage input;
 a third relay coupled between the line output terminal and at least one of the first relay and second relay;
 a fourth relay coupled between the neutral output terminal and at least one of the first relay and the second relay; and
 a controller coupled to the relays to control a state of each of the relays.

2. The circuit of claim 1, wherein the first relay includes a first output terminal and a second output terminal, the first relay is configured to couple the line terminal of the first voltage input to the first output terminal of the first relay when the first relay is in a first state, and the first relay is configured to couple the line terminal of the second voltage input to the second output terminal of the first relay when the first relay is in a second state.

3. The circuit of claim 2, wherein the second relay includes a first output terminal and a second output terminal, the second relay is configured to couple the neutral terminal of the first voltage input to the first output terminal of the second relay when the second relay is in a first state, and the second relay is configured to couple the neutral terminal of the second voltage input to the second output terminal of the second relay when the second relay is in a second state.

4. The circuit of claim 3, wherein the third relay is configured to couple the first output terminal of the first relay to the line output terminal of the voltage output when the third relay is in a first state, and the third relay is configured to couple the second output terminal of the first relay to the line output terminal of the voltage output when the third relay is in a second state.

5. The circuit of claim 3, wherein the fourth relay is configured to couple the first output terminal of the second relay to the neutral output terminal of the voltage output when the fourth relay is in a first state, and the fourth relay is configured to couple the second output terminal of the second relay to the neutral output terminal of the voltage output when the fourth relay is in a second state.

6. The circuit of claim 3, wherein the third relay is configured to couple the first output terminal of the first relay to the line output terminal of the voltage output when the third relay is in a first state, and the third relay is configured to couple the second output terminal of the second relay to the line output terminal of the voltage output when the third relay is in a second state.

7. The circuit of claim 3, wherein the fourth relay is configured to couple the first output terminal of the second relay to the neutral output terminal of the voltage output when the fourth relay is in a first state, and the fourth relay is configured to couple the second output terminal of the first relay to the neutral output terminal of the voltage output when the fourth relay is in a second state.

8. The circuit of claim 1, wherein the line output terminal of the voltage output and the neutral output terminal of the voltage output are coupled to an input of a power supply unit.

9. A power supply unit, wherein the circuit of claim 1 is integrated into the power supply unit.

10. The circuit of claim 1, wherein the first voltage input is coupled to a primary power source and the second voltage input is coupled to a secondary backup power source.

11. The circuit of claim 1, wherein at least one of the relays includes a 1A+1B relay having a normally open contact and a normally closed contact.

12. The circuit of claim 1, wherein the third relay is a single-pole, dual-throw relay and the fourth relay is a single-pole, dual-throw relay.

13. The circuit of claim 1, wherein the four relays are identical to one another.

14. A method of operating an automatic transfer switch circuit, the circuit including a first voltage input having a line terminal and a neutral terminal, a second voltage input having a line terminal and a neutral terminal, a voltage output having a line output terminal and a neutral output terminal, a first relay coupled to the line terminals of the first voltage input and the second voltage input, a second relay coupled to the neutral terminals of the first voltage input and the second voltage input, a third relay coupled between the line output terminal and at least one of the first relay and the second relay, and a fourth relay coupled between the neutral output terminal and at least one of the first relay and the second relay, the method comprising:
 placing the first relay in a first state to couple the line terminal of the first voltage input to a first output terminal of the first relay; and
 placing the first relay in a second state to couple the line terminal of the second voltage input to a second output terminal of the first relay.

15. The method of claim 14, further comprising:
placing the second relay in a first state to couple the neutral terminal of the first voltage input to a first output terminal of the second relay; and
placing the second relay in a second state couple the line terminal of the second voltage input to a second output terminal of the first relay.

16. The method of claim 15, further comprising:
placing the third relay in a first state to couple the first output terminal of the first relay to the line output terminal of the voltage output; and
placing the third relay in a second state to couple the second output terminal of the first relay to the line output terminal of the voltage output.

17. The method of claim 15, further comprising:
placing the fourth relay in a first state to couple the first output terminal of the second relay to the neutral output terminal of the voltage output; and
placing the fourth relay in a second state to couple the second output terminal of the second relay to the neutral output terminal of the voltage output.

18. The method of claim 15, further comprising:
placing the third relay in a first state to couple the first output terminal of the first relay to the line output terminal of the voltage output; and
placing the third relay in a second state to couple the second output terminal of the second relay to the line output terminal of the voltage output.

19. The method of claim 15, further comprising:
placing the fourth relay in a first state to couple the first output terminal of the second relay to the neutral output terminal of the voltage output; and
placing the fourth relay in a second state to couple the second output terminal of the first relay to the neutral output terminal of the voltage output.

* * * * *